US008223071B2

(12) United States Patent
Lee et al.

(10) Patent No.: US 8,223,071 B2
(45) Date of Patent: Jul. 17, 2012

(54) HANDHELD ELECTRONIC APPARATUS AND METHOD THEREOF

(75) Inventors: Meng-Shu Lee, Hsinchu Hsien (TW); Wen Hung Chung, Hsinchu Hsien (TW); Fu-Yuan Cheng, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 171 days.

(21) Appl. No.: 12/482,071

(22) Filed: Jun. 10, 2009

(65) Prior Publication Data
US 2010/0207815 A1 Aug. 19, 2010

(30) Foreign Application Priority Data

Feb. 19, 2009 (TW) .............................. 98105300 A (51) Int. Cl.
G01S 19/28 (2010.01)
G01S 19/05 (2010.01)
(52) U.S. Cl. .............................. 342/357.67; 342/357.42
(58) Field of Classification Search ............. 342/367.67, 342/357.67, 357, 357.42; 434/284
See application file for complete search history.

(56) References Cited

U.S. PATENT DOCUMENTS

| 2002/0152620 | A1* | 10/2002 | Lemp, III | 33/268 |
| 2003/0218546 | A1* | 11/2003 | Lemp, III | 340/815.4 |
| 2005/0030189 | A1* | 2/2005 | Foster | 340/686.1 |
| 2006/0103926 | A1* | 5/2006 | Meyers et al. | 359/430 |
| 2007/0159390 | A1* | 7/2007 | Kim | 342/357.13 |
| 2008/0091654 | A1* | 4/2008 | Kang et al. | 707/3 |
| 2009/0254274 | A1* | 10/2009 | Kulik et al. | 701/213 |
| 2010/0124735 | A1* | 5/2010 | Chen et al. | 434/284 |

FOREIGN PATENT DOCUMENTS

| CN | 1181458 A | 12/2004 |
| CN | 1758550 A | 4/2006 |

OTHER PUBLICATIONS

Chinese Patent Office, Office Action 0910164CN dated Jun. 15, 2011, 6 pages.

* cited by examiner

*Primary Examiner* — Thomas Tarcza
*Assistant Examiner* — Frank J McGue
(74) *Attorney, Agent, or Firm* — Edell, Shapiro & Finnan, LLC (57) ABSTRACT

A handheld electronic apparatus includes a positioning module, a sensing module, a constellation database, and a processing module. The positioning module generates location information associated with the handheld electronic apparatus according to a satellite signal received by the handheld electronic apparatus. The sensing module detects a vertical tilted angle and a horizontal observing direction associated with a positioned state of the handheld electronic apparatus. The processing module retrieves corresponding real-time constellation information from constellation data stored in the constellation database according to timing information, the location information, the vertical tilted angle, and the horizontal observing direction.

18 Claims, 6 Drawing Sheets

HANDHELD ELECTRONIC APPARATUS AND METHOD THEREOF

CROSS REFERENCE TO RELATED PATENT APPLICATION

This patent application is based on Taiwan, R.O.C. patent application No. 098105300 filed on Feb. 19, 2009.

FIELD OF THE INVENTION

The present invention relates to a handheld electronic apparatus, and more particularly, to a handheld electronic apparatus capable of displaying constellations and automatically adjusting displayed constellations according to observing positions, and a method thereof.

BACKGROUND OF THE INVENTION

Accompanied with continual advancement of communication technology, a diversity of handheld electronic devices, such as mobile phones, personal digital assistants (PDAs) and satellite navigation devices that are designed to provide various functions, are now considered as necessities in people's daily life. Among the handheld electronic devices, satellite navigation devices with navigation and route planning capabilities are particularly popular.

A satellite navigation device generally receives current location and timing information associated with the satellite navigation device through a satellite positioning system. Common satellite positioning systems include Global Positioning System (GPS) and Assisted Global Positioning System (AGPS).

Apart from conventional satellite positioning and navigation functions, newer satellite positioning systems further provide users with added functions such as playing digital television, playing music and displaying constellations. When the user activates a constellation display function of the satellite navigation device, and according to location information (e.g., the longitude and latitude) and timing information received by a receiver from the satellite positioning system, the satellite navigation device selects the constellations corresponding to a current location of the user and a current season from a large selection of constellations stored in a database, and displays the selected constellations onto a monitor of the satellite navigation device. Thus, the user is able to observe both the constellations displayed on the satellite navigation system and the constellations in the sky.

However, by using a satellite navigation system for constellation observation, a user is nevertheless faced with certain complications and inconveniences. For example, since a monitor of a common satellite navigation device is rather small, the monitor is only able to display constellations of a part of the sky corresponding to what the user can actually see. That is, the device cannot completely display constellations of the entire viewable sky. Once the user changes an observing direction, manual adjustment is needed to change positions of the constellations displayed on the monitor of the satellite navigation device, so that the constellations displayed on the monitor of the satellite navigation device correctly correspond the observed constellations in the sky. Such mechanism is indeed inconvenient for the user.

Therefore, it is an objective of embodiments of the invention to provide a handheld electronic apparatus and a method thereof for, among other things, overcoming the foregoing issue.

SUMMARY OF THE INVENTION

According to a first embodiment of the invention, a handheld electronic apparatus is provided. In practice, the handheld electronic apparatus may be, but is not limited to, an electronic apparatus capable of receiving satellite signals or an electronic apparatus with satellite positioning capabilities, such as a mobile phone and a satellite navigation device.

In this embodiment, the handheld electronic apparatus comprises a positioning module, a sensing module, a constellation database and a processing module. The processing module is coupled to the positioning module, the sensing module and the constellation database. The positioning module generates location information associated with the handheld electronic apparatus according to a satellite signal received by the handheld electronic apparatus. The sensing module detects a vertical tilted angle and a horizontal observing direction associated with a positioned state of the handheld electronic apparatus. The processing module retrieves real-time constellation information from constellation data stored in the constellation database according to timing information, the location information, the vertical tilted angle and the horizontal observing direction.

According to a second embodiment of the invention, a method of retrieving real-time constellation information for a handheld electronic apparatus capable of receiving a satellite signal is disclosed. In this embodiment, the method comprises steps of: generating location information of the handheld electronic apparatus according to the satellite signal; detecting a vertical tilted angle and a horizontal observing direction associated with a positioned state of the handheld electronic apparatus; generating current information according to the location information, the vertical tilted angle, the horizontal observing direction and timing information; and retrieving the real-time constellation information according to the current information.

With embodiments of the present invention, the user can easily operate the handheld electronic apparatus for observing constellations in the sky. In the event that even if an observing location of the user is changed, the handheld electronic device is still capable of automatically updating the constellation information displayed on the monitor in real time to enable the user to identify the constellations in the sky. As such, the handheld electronic apparatus according to the invention effectively eliminates the complications and inconveniences of manual adjustment for changing positions of the constellations displayed on the monitor of a conventional satellite navigation device.

Further, the handheld electronic apparatus also provides a guiding function. More specifically, by entering or selecting coordinates of a target constellation, the handheld electronic apparatus can display guiding information such as texts or arrows on the monitor to guide the user to change the vertical tilted angle and the horizontal observing direction of the handheld electronic apparatus, or even move the handheld electronic apparatus to an appropriate observing position, so as to successfully find the target constellation.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

According to a first embodiment of the invention, a handheld electronic apparatus is provided. In practice, the handheld electronic apparatus may be, but is not limited to, an electronic apparatus capable of receiving satellite signals or an electronic apparatus with satellite positioning capabilities, such as a mobile phone and a satellite navigation device.

Figure 1:
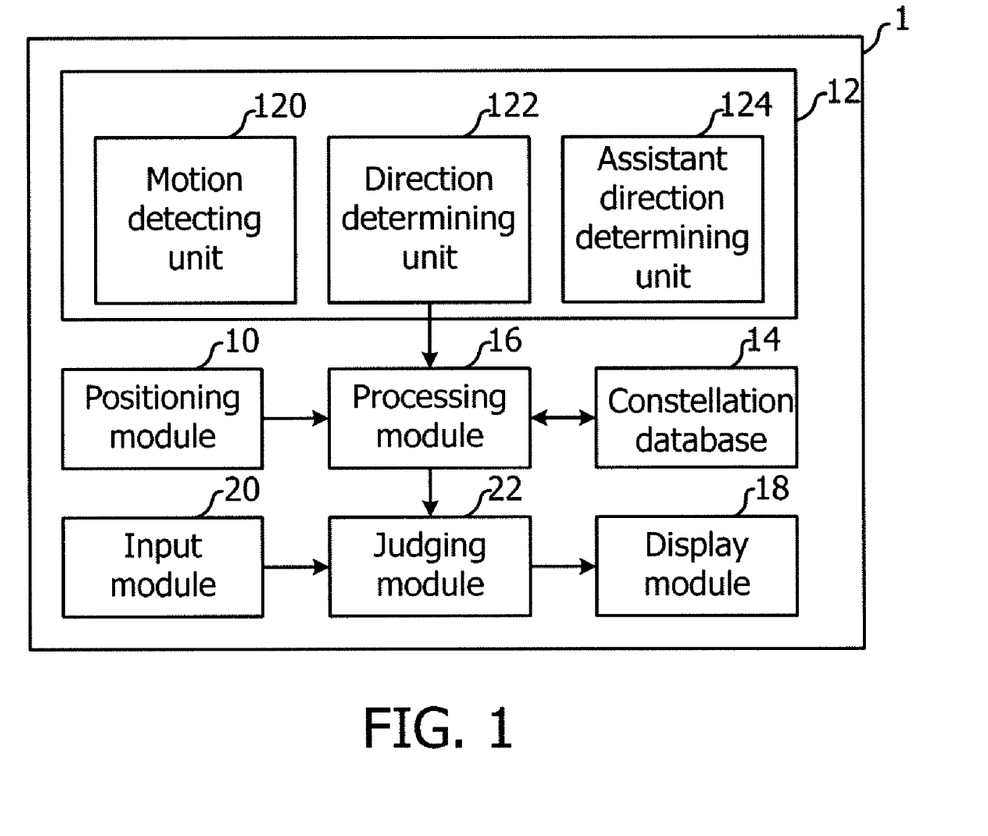
FIG. 1 is a functional block diagram of a handheld electronic apparatus according to a first embodiment of the invention.

Referring to FIG. 1, a handheld electronic apparatus 1 comprises a positioning module 10, a sensing module 12, a constellation database 14, a processing module 16, a display module 18, an input module 20 and a judging module 22. The processing module 16 is coupled to the positioning module 10, the sensing module 12, the constellation database 14 and the judging module 22. The display module 18 and the input module 20 are respectively coupled to the judging module 22. In this embodiment, the sensing module 12 comprises a motion detecting unit 120, a direction determining unit 122 and an assistant direction determining unit 124. The various modules of the handheld electronic apparatus 1 are discussed in detail below.

The positioning module 10 of the handheld electronic apparatus 1 is for confirming a location of the handheld electronic apparatus 1, as the name suggests. In this embodiment, the handheld electronic apparatus 1 receives from a satellite positioning system a satellite signal, according to which the positioning module 10 generates location information of the handheld electronic apparatus 1. The location information is generally expressed in longitudinal and latitudinal coordinates; the invention is not limited thereto, however. The positioning module 10 may also generate timing information of the handheld electronic apparatus 1 according to the satellite signal, or the timing information may be a local time, for example.

In practice, the abovementioned positioning system may be the most common satellite positioning systems, such as Global Positioning System (GPS), Assisted Global Positioning System (AGPS), Global Navigation Satellite System (GLONASS) and Galileo positioning system, for example.

In this embodiment, the sensing module 12 detects a vertical tilted angle and a horizontal observing direction associated with a positioned state of the handheld electronic apparatus 1—the vertical tilted angle is detected by the motion detecting unit 120 of the sensing module 12, and the horizontal observing direction is determined by the direction determining unit 122 of the sensing module 12.

For example, the motion detecting unit 120 of the sensing module 12 may be a gravity-sensor (g-sensor) such as the MMA1260d of Freescale or other instruments capable of detecting vertical angle changes. A common g-sensor is capable of not only measuring an acceleration of an object but also obtaining different voltage outputs by changing a positioned angle of the g-sensor at a still state. These measurements may be obtained by using capacitance effects between two plates, where a distance between the two plates is changed as a result of acceleration or changes in angles, thus generating different capacitance values to generate different voltage outputs.

When an observer, facing a particular direction, observes the constellations in the sky, a vertical observing direction range of the observer is from 0 degrees when the eyes look to the front to 90 degrees when the eyes look up to the top. Note that a vertical perception range of the human eyes is around 60 degrees. When there is change in the vertical observing angle of the observer, constellations displayed on the display module 18 (i.e., the monitor) of the handheld electronic apparatus 1 needs to be updated accordingly to enable the user to observe the appropriate constellations. In this embodiment, by using the motion detecting unit 120 of the sensing module 12 capable of detecting an elevational angle of the monitor of the handheld electronic apparatus 1 positioned by the user, the handheld electronic apparatus 1 can automatically update the constellations with respect to changes in the vertical direction.

In practice, the direction determining unit 122 of the sensing module 12 may be an e-compass for indicating north, based on which an included angle between the north and the monitor of the handheld electronic apparatus 1 is calculated to obtain the horizontal direction of the monitor of the handheld electronic apparatus 1. However, the actual constellation observation angle of the user is not necessarily equal to the horizontal direction of the monitor of the handheld electronic apparatus 1, and may be associated with a vertical angle of a positioned state of the monitor of the handheld electronic apparatus 1. Three possible situations of the observing direction of the user and the horizontal direction of the monitor of the handheld electronic apparatus 1 shall be illustrated below with reference to FIGS. 2A to 2C.

Figure 2A:
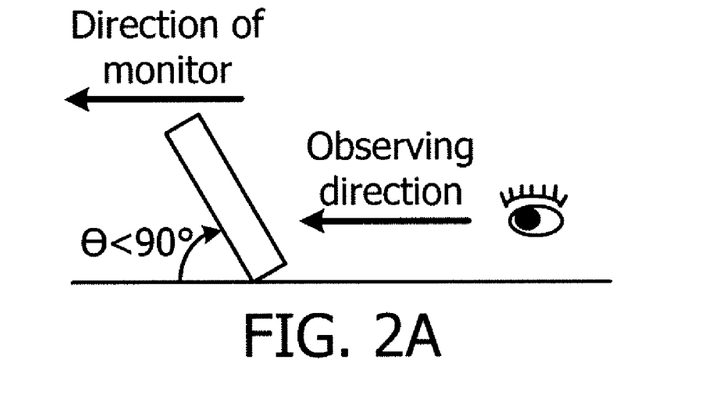
FIGS. 2A to 2C are schematic diagrams of three possibilities of an observing direction of a user and a direction of a monitor of the handheld electronic apparatus.

FIG. 2A shows the first situation when a vertical angle θ of the monitor of the handheld electronic apparatus 1 is smaller than 90 degrees. As shown, the observing direction is in agreement with the horizontal direction of the monitor; that is, the horizontal direction of the monitor determined by the e-compass may serve as the observing direction.

Figure 2B:
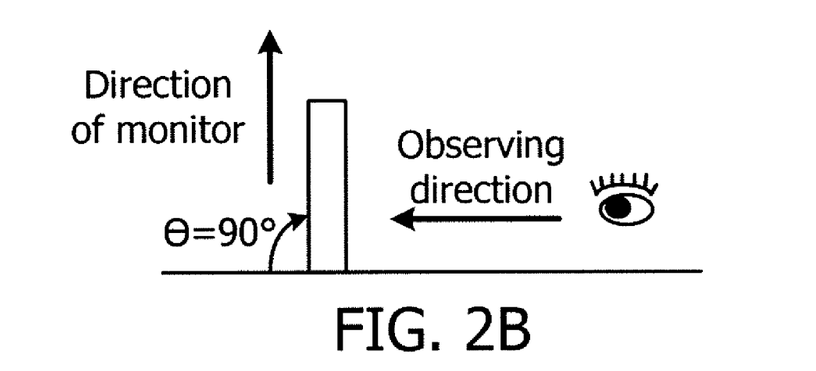

FIG. 2B shows the second situation when the vertical angle θ of the monitor of the handheld electronic apparatus 1 is equal to 90 degrees. As shown, the top of the monitor is in fact pointing to the sky, such that the e-compass is incapable of determining the horizontal direction of the monitor. Supposing that the vertical angle θ of the monitor remains at 90 degrees when the user rotates the handheld electronic apparatus 1, the e-compass is also unable to determine the horizontal direction of the monitor. At this point, by implementing the assistant direction determining unit 124 that is a g-sensor with three-axial sensing capabilities, the handheld electronic apparatus 1 is still able to determine the horizontal direction of the monitor to solve the difficulty of an ineffective e-compass.

Figure 2C:
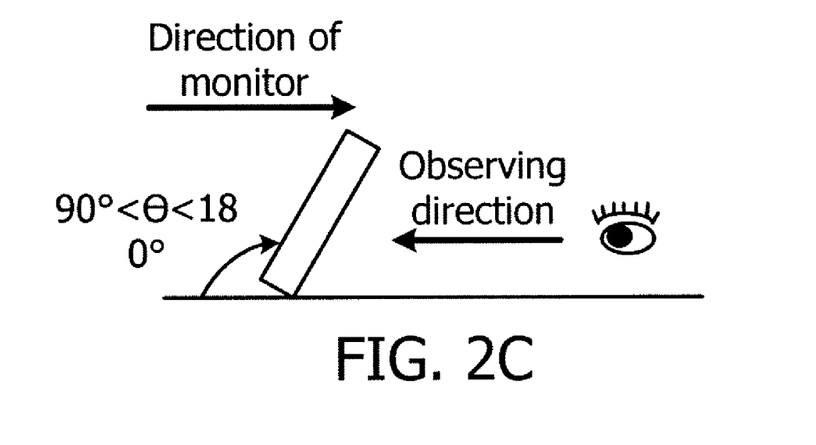

FIG. 2C shows the third situation when the vertical angle θ of the monitor of the handheld electronic apparatus 1 is greater than 90 degrees but smaller than 180 degrees. As shown, the observing direction is opposite to the horizontal direction of the monitor. Therefore, the horizontal direction of the monitor determined by the e-compass is first flipped by 180 degrees to restore to an original direction in the opposite to serve as the observing direction.

In this embodiment, the constellation database 14 is stored with constellation data, such as but not limited to constellations. The processing module 16 receives the vertical tilted angle and the horizontal observing direction provided by the sensing module 12, and the location and timing information of the handheld electronic apparatus 1 provided by the positioning module 10. Using all of the above information, a comparison is carried out with the constellation data stored in the constellation database to retrieve real-time constellation information from the constellation data stored in the constellation database. For example, the real-time constellation information may be a certain part corresponding to the entire constellation data. The display module 18 then displays the real-time constellation information for the user to observe.

Note that the handheld electronic apparatus 1 may periodically (e.g., every minute) update the constellations, or update the constellations whenever at least one type of the information from the location information, the timing information, the vertical tilted angle and the horizontal observing direction is changed.

Apart from displaying constellations, the handheld electronic apparatus 1 further has a guiding function for guiding the user to find desired constellations for observation. In this embodiment, associated information such as a constellation name or constellation coordinates of a target constellation are entered via the input module 20 into the handheld electronic apparatus 1. When the processing module 16 generates the real-time constellation information that is then displayed at the display module 19, the judging module 22 determines whether the real-time constellation information includes the target constellation information. When a result from the judging module 22 is affirmative, the display module 18 displays the target constellation for the user to identify. When the result from the judging module 22 is negative, the display module 18 displays a prompt message through texts or arrows, for example, to guide the user to change the vertical tilted angle or the horizontal direction of the monitor of the handheld electronic apparatus 1 in order to find the desired target constellation.

Figure 3A:
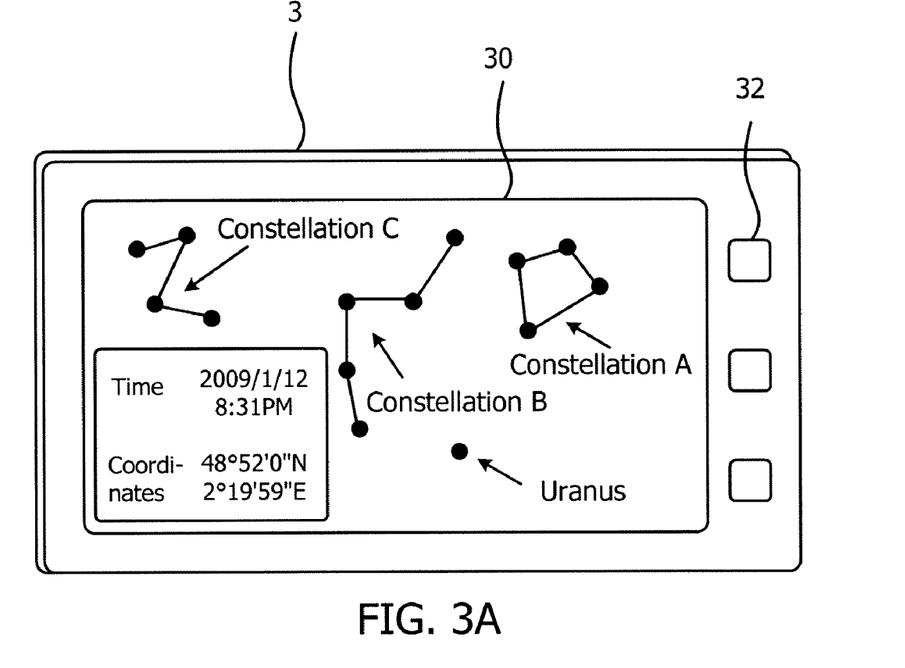
FIGS. 3A to 3D are examples of operating a Global Positioning System (GPS) device.

An example shall be discussed to illustrate operations of the handheld electronic apparatus 1. Referring to FIG. 3A, a GPS navigation device 3 comprises a monitor 30 and a function key 32. On the monitor 30 of the GPS navigation device 30, the current time and coordinates as well as constellations of a constellation A, a constellation B, a constellation C and Uranus are displayed.

Figure 3B:
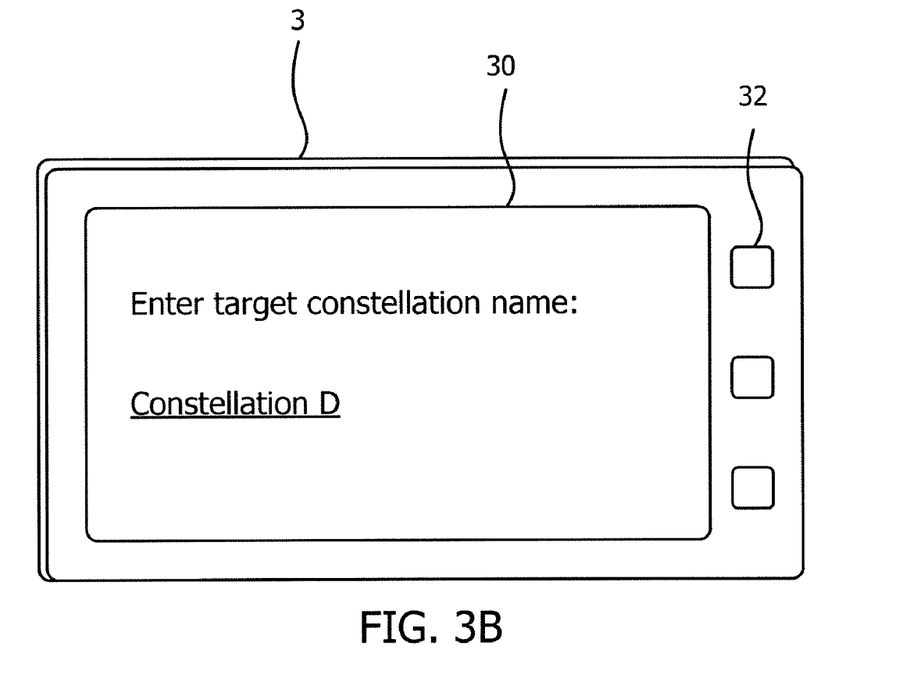
Figure 3C:
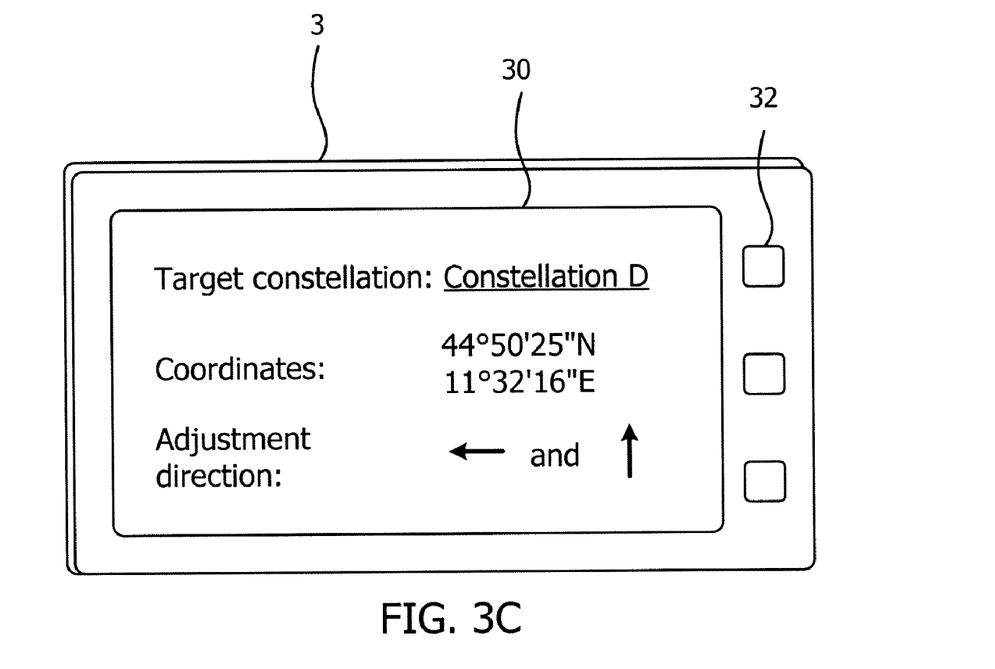
Figure 3D:
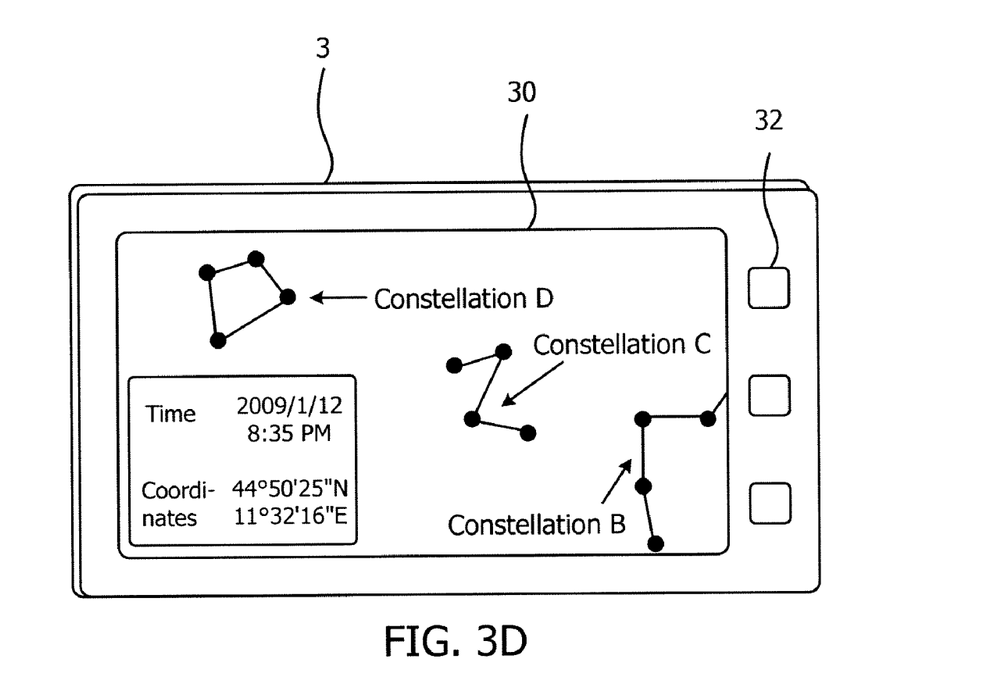

When the user wishes to find a target constellation using the GPS navigation device 3, the monitor 30 displays a prompt message of "enter the target constellation name". As shown in FIG. 3B, supposing the user enters the "constellation D" as the target constellation, the monitor 30 correspondingly displays the name, the coordinates and the suggested adjustment direction as shown in FIG. 3C. Therefore, by following the prompt message of the GPS navigation device 3, the user can more easily find the desired constellation D in the sky. Further, in response to operations of the user, the monitor 30 also automatically updates the displayed constellations to the constellations including the constellation D, as shown in FIG. 3D.

According to a second embodiment of the invention, a method of retrieving real-time constellation information for a handheld electronic apparatus is provided. In this embodiment, the handheld electronic apparatus may be, but is not limited to, an electronic apparatus capable of receiving satellite signals or an electronic apparatus with satellite positioning capabilities, such as a mobile phone and a satellite navigation device.

Through the method, the user is able to observe constellations in the sky in conjunction with real-time constellations displayed by the handheld electronic apparatus. In the event that even if an observing location of the user is changed, the handheld electronic device is still capable of automatically updating the constellation information displayed on the monitor in real time. Consequently, the complications and inconveniences of manual adjustment in the prior art are eliminated.

Figure 4:
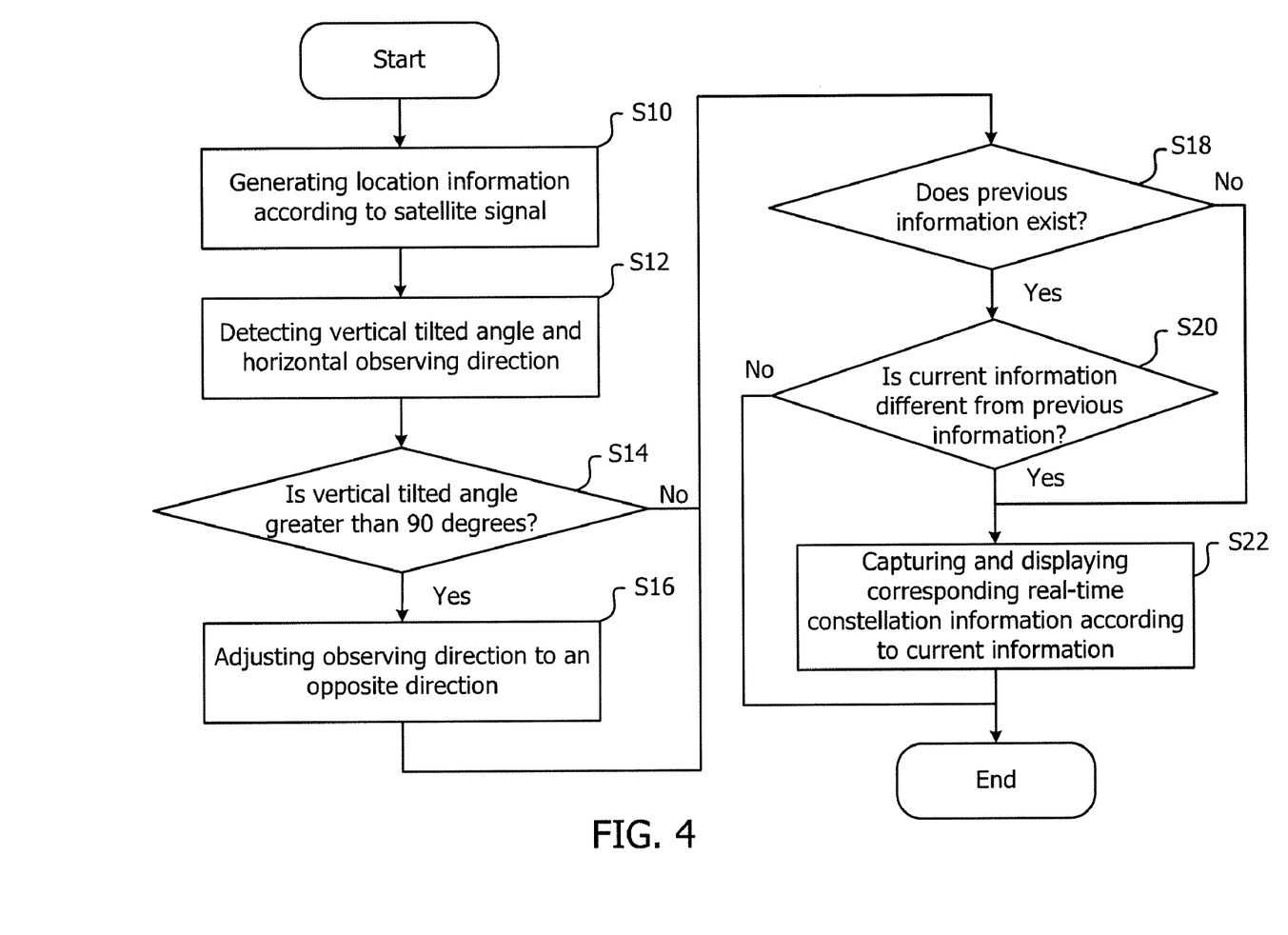
FIG. 4 is a flowchart of operations of the handheld electronic apparatus according to a second embodiment of the invention.

FIG. 4 shows a flowchart of a method of retrieving real-time constellation information for the handheld electronic apparatus. Note that the method according to this embodiment may periodically (e.g., every minute) update the constellations, or update the constellations whenever at least one type of information from the location information, the timing information, the vertical tilted angle and the horizontal observing direction is changed.

In FIG. 4, the method starts with Step S10 of generating location information associated with the handheld electronic apparatus according to a satellite signal, which is received by the handheld electronic apparatus from an external positioning system. In Step S12, a vertical tilted angle and a horizontal observing direction associated with a positioned state of the handheld electronic apparatus are detected. Note that Steps S10 and S12 may be exchanged and performed without any particular order, or even performed simultaneously.

In Step S14, it is determined whether the vertical tilted angle is greater than 90 degrees. Step S16 is performed when a result form Step S14 is affirmative to adjust the horizontal observing direction to an opposite direction of an original direction. More specially, when the vertical tilted angle of the positioned handheld electronic apparatus is greater than 90 degrees, it means that the observing direction of the handheld electronic apparatus held by the user is in fact an opposite direction of the horizontal observing direction detected in Step S12.

For example, suppose the vertical tilted angle of the positioned handheld electronic apparatus detected is 120 degrees, and the horizontal observing direction is the west. Since the vertical tilted angle is greater than 120 degrees, it means that the constellation observing direction of the user holding the handheld electronic apparatus is in fact the opposite direction of the west, that is, the east.

After Step S16, Step 18 is performed to determine whether previous information exists. The previous information includes location information, timing information, vertical tilted angle and horizontal observing direction acquired at a previous time point. Note that the method nevertheless performs Step S18 even when the result from Step S14 is negative.

In this embodiment, as mentioned, Step S18 is for confirming whether previous information acquired at a previous time exists. When a result from Step S18 is affirmative, it means that the handheld electronic apparatus has previously acquired information at a previous time point, including the previous location and timing information, the vertical tilted angle and the horizontal observing direction, and Step S20 is performed to determine whether current information including location and timing information, vertical tilted angle and horizontal observing direction at a current time point is different from the previous information. The forgoing timing information may be generated by the handheld electronic apparatus according to the satellite signal, or may be a local time.

When a result from Step S20 is affirmative, it means the current information is different from the previous information. That is, at least one type of the information from the location information, the timing information, the vertical tilted angle and the horizontal observing direction is changed, and so the previous information is to be updated to the current information. Step S22 is then performed. In Step S22, corresponding real-time constellation information is retrieved from a constellation database and displayed on a monitor of the handheld electronic apparatus.

When the result from Step S18 is negative, it means the handheld electronic apparatus does not have previously acquired information including the location information, the timing information, the vertical tilted angle and the horizontal observing direction. That is, the currently acquired location information, timing information, vertical tilted angle and horizontal observing direction are first information ever received. At this point, Step S22 is performed directly. In Step S22, corresponding real-time constellation information is retrieved from the constellation database and displayed on the monitor of the handheld electronic apparatus.

When the result from Step S20 is negative, it means that the current information is identical to the previous information; that is, there are no changes in the location information, the timing information, the vertical tilted angle and the horizontal observing direction, so that the method need not update the previous information to the current information.

According to a third embodiment of the invention, a method of retrieving real-time constellation information for a handheld electronic apparatus is provided. In this embodiment, the handheld electronic apparatus may be, but is not limited to, an electronic apparatus capable of receiving satellite signals or an electronic apparatus with satellite positioning capabilities, such as a mobile phone and a satellite navigation device.

Through the method, the user is able to observe constellations in the sky in conjunction with real-time constellations displayed by the handheld electronic apparatus. In the event that even if an observing location of the user is changed, the handheld electronic device is still capable of automatically updating the constellation information displayed on the monitor in real time. Consequently, the complications and inconveniences of manual adjustment in the prior art are eliminated.

Figure 5:
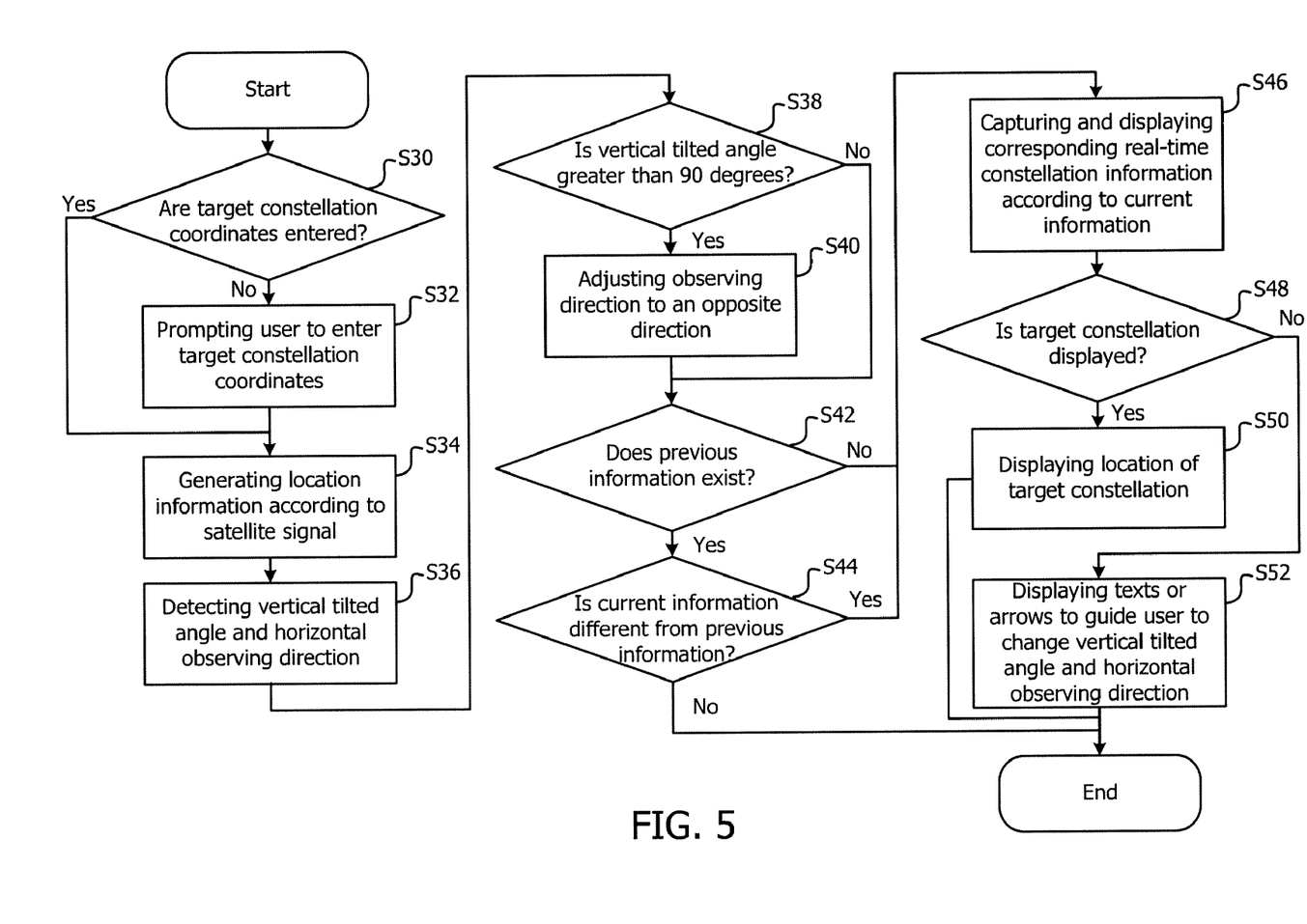
FIG. 5 is a flowchart of operations of the handheld electronic apparatus according to a third embodiment of the invention

FIG. 5 shows a flowchart of the method of retrieving real-time constellation information for the handheld electronic apparatus. Note that the method according to this embodiment may periodically (e.g., every minute) update the constellations, or update the constellations whenever at least one type of the information from the location information, the timing information, the vertical tilted angle and the horizontal observing direction is changed.

In FIG. 5, the method starts with Step S30 of determining whether coordinates of a target constellation are entered. When a result from Step S30 is negative, it means that the coordinates of the target constellation are not yet entered. Step S32 is then performed to prompt the user to enter the coordinates of the target constellation.

When the coordinates of the target constellation are entered, Steps S34 to S46 are performed. Steps S34 to S46 are similar to Steps S10 to S22 of the second embodiment, and discussion thereof shall be omitted here for brevity.

When the real-time constellation information is displayed on the monitor of the electronic handheld apparatus, Step S48 is performed to determine whether the target constellation is displayed. When a result from Step S48 is affirmative, it means that the real-time constellation information being displayed on the monitor of the handheld electronic apparatus includes the desired target constellation. Step S50 is then performed to indicate locations of the target constellation for the user to observe.

When the result from Step S48 is negative, it means that the real-time constellation information being displayed on the monitor of the handheld electronic apparatus excludes the desired target constellation. That is, the observing location of the user or a positioned angle of the handheld electronic apparatus is inappropriate, and hence Step S52 is performed. In Step S52, through texts or arrows on the monitor, the user is guided to change the vertical tilted angle or the horizontal observing direction associated with the positioned state of the handheld electronic apparatus, or the observing location, to guide the user to successively find and observe the desired target constellation.

Therefore, according to the handheld electronic apparatus and the method thereof, constellation information displayed on a monitor of the handheld electronic apparatus is automatically updated in real time. Accordingly, even if an observing location of the user is changed, the user is still able to observe constellations in the sky using the handheld electronic apparatus through simple manipulations, instead of having to manually adjust constellation positions as in the prior art.

Further, the handheld electronic apparatus is provided with a guiding function. By entering or selecting coordinates of a target constellation, the handheld electronic apparatus can display guiding information such as texts or arrows on the monitor to guide the user to change the vertical tilted angle and the horizontal observing direction of the handheld electronic apparatus, or even move the handheld electronic apparatus to an appropriate observing position, so as to successfully find the target constellation. Thus, not only is value added to the handheld electronic apparatus are expanded, but enjoyment is increased when operating the handheld electronic apparatus.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A handheld electronic apparatus, for receiving a satellite signal, comprising:
   a positioning module, for generating location information according to the satellite signal;
   a sensing module, for detecting a vertical tilted angle relative to a horizontal plane and a horizontal observing direction relative to a compass, the vertical tilted angle and the horizontal observing direction being associated with a positioned state of the handheld electronic apparatus, wherein the sensing module senses a horizontal observing direction in an original direction when the vertical tilt angle is less than 90 degrees and senses a horizontal observing direction in an opposite direction when the vertical tilt angle is greater than 90 degrees, and wherein the horizontal observing direction is adjusted to an opposite direction to the original direction when the vertical tilted angle is greater than 90 degrees;
   a constellation database, stored with constellation data; and
   a processing module, coupled to the positioning module, the sensing module and the constellation database, for retrieving real-time constellation information from the constellation data according to the location information, the vertical tilted angle, the horizontal observing direction, and timing information.

2. The handheld electronic apparatus as claimed in claim 1, wherein the timing information is generated by the positioning module according to the satellite signal.

3. The handheld electronic apparatus as claimed in claim 1, wherein the timing information is a local time.

4. The handheld electronic apparatus as claimed in claim 1, wherein the sensing module comprises:
- a motion sensing unit, for detecting the vertical tilted angle; and
- a direction determining unit, for determining the horizontal observing direction.

5. The handheld electronic apparatus as claimed in claim 4, wherein the motion sensing unit is a gravity sensor (g-sensor).

6. The handheld electronic apparatus as claimed in claim 4, wherein the direction determining unit is an e-compass.

7. The handheld electronic apparatus as claimed in claim 4, wherein the sensing module further comprises an assistant direction determining unit for determining the horizontal observing direction when the vertical tilted angle equals 90 degrees.

8. The handheld electronic apparatus as claimed in claim 7, wherein the assistant direction determining unit is a three-axial g-sensor.

9. The handheld electronic apparatus as claimed in claim 1, further comprising:
- a display module, coupled to the processing module, for displaying the real-time constellation information retrieved by the processing module.

10. The handheld electronic apparatus as claimed in claim 9, further comprising:
- an input module, for entering target constellation information; and
- a judging unit, coupled to the input module and the display module, for judging whether the real-time constellation information comprises the target constellation information when the display module displays the real-time constellation information;

wherein, the display module indicates coordinates of the target constellation information when a result from the judging module is affirmative, or displays a prompt message corresponding to the target constellation information when the result form the judging module is negative.

11. The handheld electronic apparatus as claimed in claim 1, wherein the positioning module receives the location information from a positioning system.

12. The handheld electronic apparatus as claimed in claim 11, wherein the positioning system is a Global Positioning System (GPS), an Assisted Global Positioning System (AGPS), a Global Navigation Satellite System (GLONASS) or a Galileo positioning system.

13. A method of retrieving real-time constellation information for a handheld electronic apparatus, comprising steps of:
- generating location information of the handheld electronic apparatus according to a satellite signal;
- detecting a vertical tilted angle relative to a horizontal plane and a horizontal observing direction relative to a compass, the vertical tilted angle and the horizontal observing direction being associated with a positioned state of the handheld electronic apparatus, wherein a horizontal observing direction is detected in an original direction when the vertical tilt angle is less than 90 degrees and a horizontal observing direction is detected in an opposite direction when the vertical tilt angle is greater than 90 degrees, and wherein the horizontal observing direction is adjusted to an opposite direction to the original direction when the vertical tilted angle is greater than 90 degrees;
- generating current information according to the location information, the vertical tilted angle, the horizontal observing direction, and timing information; and
- retrieving the real-time constellation information according to the current information.

14. The method as claimed in claim 13, wherein the retrieving step comprises a step of:
- judging whether the current information is different from previous information generated at a previous time point, and retrieving the real-time constellation information from a constellation database according to the current information when a result is affirmative.

15. The method as claimed in claim 13, wherein the timing information is generated according to the satellite signal.

16. The method as claimed in claim 13, wherein the timing information is a local time.

17. The method as claimed in claim 13, further comprising a step of displaying the real-time constellation information.

18. The method as claimed in claim 13, further comprising a step of judging whether the real-time constellation information comprises target constellation information, and displaying the target constellation information when a result is affirmative or displaying a prompt message corresponding to the target constellation when the result is negative.

* * * * *